June 7, 1932.  R. G. ANDERSON  1,862,355
FLEXIBLE COUPLING
Filed Aug. 11, 1930   3 Sheets-Sheet 1

Inventor:
Robert G. Anderson,
by Charles E. Tullar
His Attorney.

Inventor:
Robert G. Anderson,
by Charles E. Mullen
His Attorney.

June 7, 1932.  R. G. ANDERSON  1,862,355
FLEXIBLE COUPLING
Filed Aug. 11, 1930  3 Sheets-Sheet 3

Inventor:
Robert G. Anderson,
by Charles V. Mullan
His Attorney.

Patented June 7, 1932

1,862,355

UNITED STATES PATENT OFFICE

ROBERT G. ANDERSON, OF HARBORCREEK, PENNSYLVANIA, ASSIGNOR TO GENERAL ELECTRIC COMPANY, A CORPORATION OF NEW YORK

FLEXIBLE COUPLING

Application filed August 11, 1930. Serial No. 474,386.

My invention relates to flexible couplings and has for its object the provision of a simplified and improved construction for coupling two rotatable elements in such manner that their axes can be displaced relative to each other without impairing the effectiveness of the driving connection between them. I do this by joining the rotatable elements by a linkage comprising members extending axially of the rotatable elements and joined intermediate of their ends by a connection or link which prevents rotation of the axially extending members about the shaft and axle. This arrangement gives a simple coupling structure for the transmission of torque between two rotatable elements permitting relative displacement of their axes without producing any forces tending to change their relative axial position.

My invention will be more fully set forth in the following description referring to the accompanying drawings and the features of novelty which characterize my invention will be pointed out with particularity in the claims annexed to and forming a part of this specification.

Figure 1:
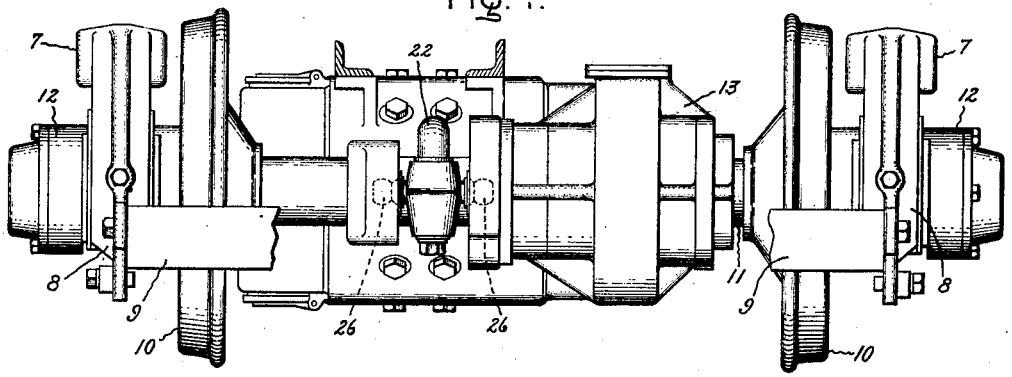
Figure 2:
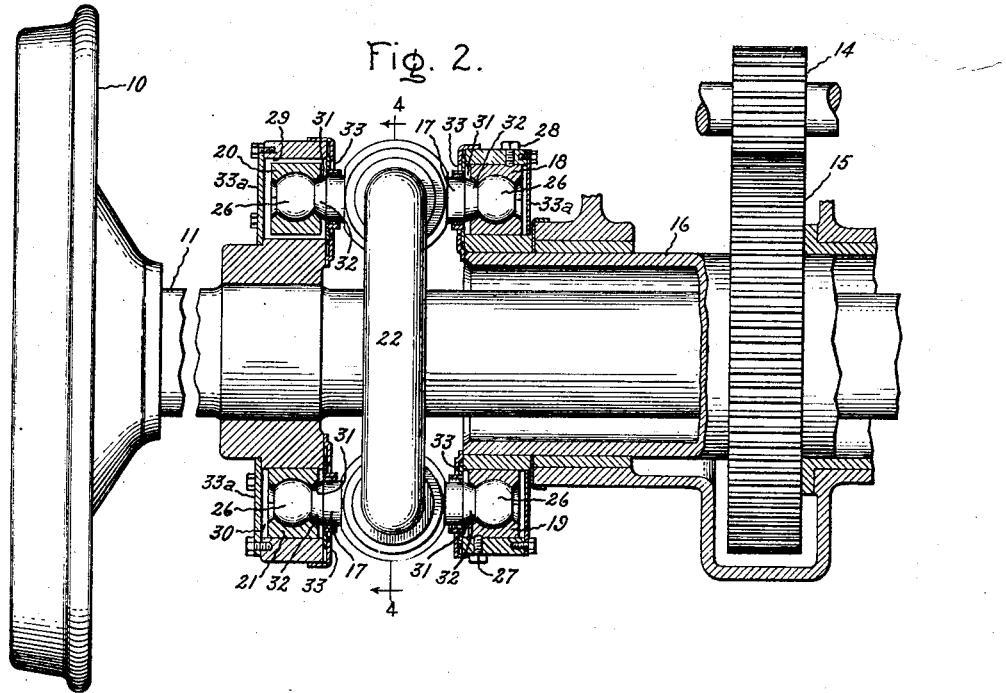
Figure 3:
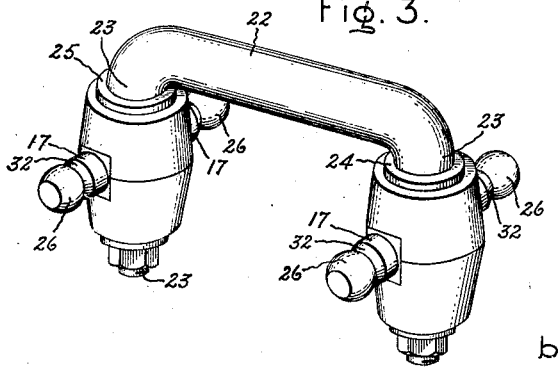
Figure 4:
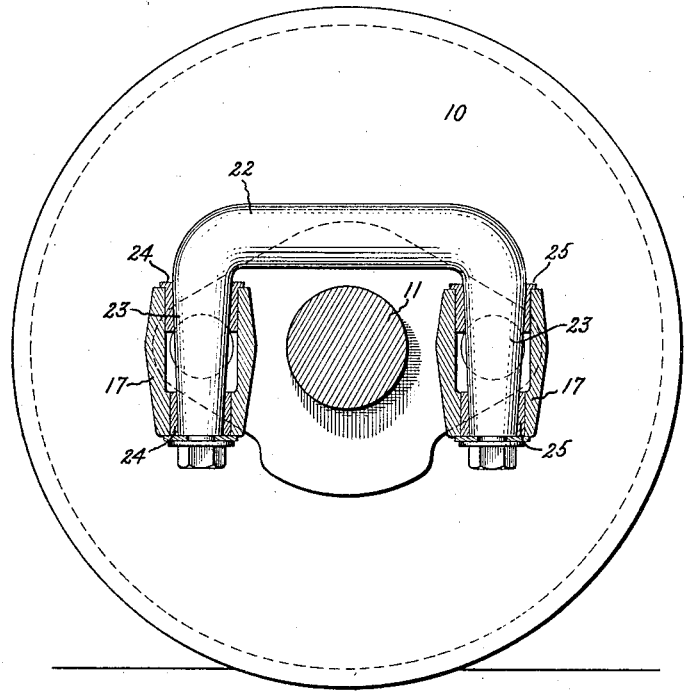
Figure 5:
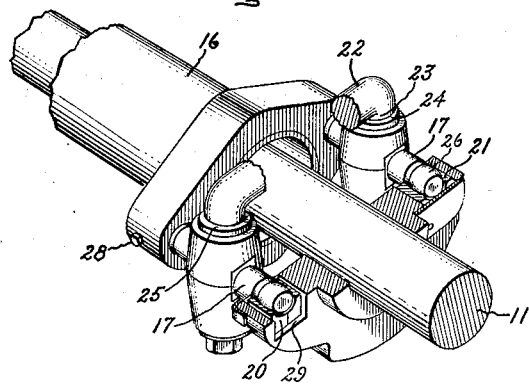
Figure 6:
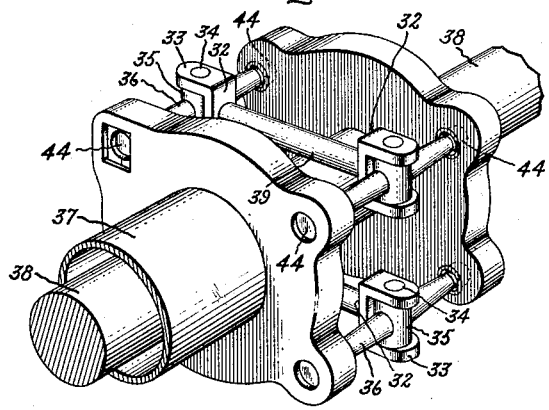
Figure 7:
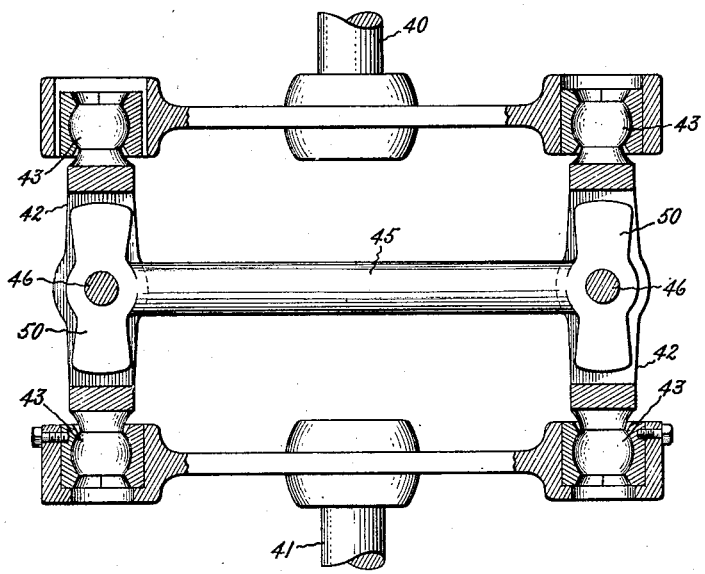
Figure 8:
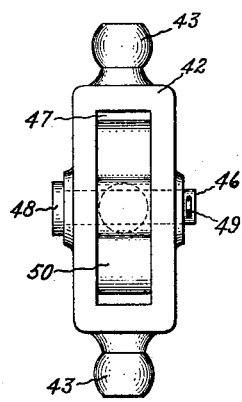

As illustrated in the drawings, Fig. 1 is a transeverse section of a locomotive or car truck employing a coupling embodying my invention, partly broken away to more clearly show the construction; Fig. 2 is a plan view, in partial section, of the structure shown in Fig. 1; Fig. 3 is a perspective view of the linkage of the coupling shown in Figs. 1 and 2; Fig. 4 is a sectional view on the line 4—4 of Fig. 2; Fig. 5 is a perspective view in partial section of the coupling shown in Figs. 1 to 4; Fig. 6 is a perspective view of a modification of my improved coupling; Fig. 7 is a plan view partially broken away of a further modification of my improved coupling; Fig. 8 is an end view of the linkage of the coupling shown in Fig. 7.

In order to more clearly set forth the nature and scope of my invention several modifications thereof have been illustrated.

The preferred form of my invention, illustrated in Figs. 1 to 5, is shown in connection with the truck of a locomotive or car comprising driving wheels 10 secured to an axle 11 in the usual manner, and journal boxes 12 for supporting the truck frame on the axle 11. The truck is also provided with spring seats 7 and pedestal jaws 8 engaging the journal boxes in order to support a framework 9 carrying a driving mechanism for the truck independent of the main frame of the truck. This driving mechanism includes a motor 13, or any other suitable source of motive power, having a pinion 14 engaging a driving gear 15 secured to a quill shaft 16, which surrounds the axle 11. The motor pinion 14 is maintained in proper alignment with the driving gear 15, which latter is rigidly attached to the quill shaft and together constitute the driving mechanism which is supported on the truck frame 9 and spring borne on the axle 11 and the wheels 10, and are not subject to the shocks received by the wheels. By this arrangement the driving wheels and axle can sway slightly and move vertically relative to the quill shaft and gear when the locomotive or car truck passes over irregularities or curves in the track.

A coupling is provided between the quill shaft 16 and the unitary structure and the axle 11 of the truck frame which will permit relative movement of the two structures and still transmit torque between them. This is accomplished in accordance with my invention by providing a linkage including a plurality of members 17 extending axially of the rotatable elements and being connected thereto by bearings 18, 19, 20 and 21 and joined intermediate their ends by a connection or link 22. As can readily be seen by referring to Figs. 3, 4 and 5, the ends of the link 22 are bent at right angles to the link to form the arms 23 which are supported in bearings 24 and 25 in the members 17 intermediate their ends so as to permit rotation of the members in the plane perpendicular to the axes of the bearings 24 and 25, but not in the plane of the axes of the link 22. Balls 26 are formed at the ends of the member 17 and seated in sockets formed in bearings 18 and 19 carried by the quill shaft and in bearings 20 and 21 carried by the axle so as to couple the shaft and axle together.

The bearing members 18 and 19 are secured to the quill shaft structure in openings provided therefor by set screws 27 and 28, and the bearing members 20 and 21 fit slidingly in the openings 29 and 30 in the axle structure. Bearing 20 is made rectangular in section and makes sliding contact of the usual clearance on two sides parallel to the axis of link 22, which are the sides on which the force due to the transmitted torque is applied. The bearing 20 fits loosely on the other two sides to permit any adjustment in this direction relative to the axle which might be required to prevent binding of the movable bearings which might be caused by inaccuracies in the machining of the parts of the coupling. Upon tilting of the quill with respect to the axle the distance between the rotatable elements is changed and as the bearings 18 and 19 in one of them are fixed relative thereto and to each other, it becomes necessary that some other part of the structure shall move axially of the rotatable elements. This movement is obtained by the axial sliding of the bearings 20 and 21 in their openings in the other rotatable element.

Each of the bearing members 18, 19, 20 and 21 are formed in two sections to provide for insertion of the balls therein. The openings are formed with tapered portions 31 with which tapered portions 32 of the members 17 cooperate to permit angular movement of the member 17 with respect to the bearing. Thus it is seen that the shaft and axle are free to move relative to each other in any direction except the direction of the transmission of torque.

To prevent dust and dirt from entering the bearings 18, 19, 20 and 21, and still not restrict the movement of members 17, cover plates 33 are slidingly arranged on the side toward the linkage over the openings provided for the bearing members and cover plates 33a close the other ends of the openings.

Torque is transmitted from the quill shaft to the axle by oppositely acting force couples which act transversely of the link 22 at the end thereof. These force couples are applied to link 22 through the arms 23 which are acted upon by the members 17. The forces exerted for the transmission of torque by the quill shaft and the resisting forces of the axle on the members 17 are at all times transverse to the axis of the link 22 and since the members 17 cannot move about the axis of the link 22 all forces in this transverse direction are transmitted thereto. The link 22 is subjected therefore to a torsional stress resulting from the force couples acting in opposite directions at the ends thereof. This gives the coupling a desirable resiliency and prevents the transmission of shocks from the axle to the quill shaft, as these shocks are absorbed in the link 22 by its deflection under torsional stress.

When a locomotive or car passes over irregularities or curves in the track the driving wheels and axle sway slightly and move vertically relative to the quill shaft and gear causing relative angularity or vertical displacement between the axes of the shaft and axle. The parts of the coupling under these conditions assume new positions and their movement depends on the position of the link 22 relative to the displacement. If the displacement is axial of the link 22 the members 17 turn angularly in bearings 24 and 25 on the arms 23 and about the balls at the extremities of said members and are swung out of the axial direction of the shaft and axle, shortening the perpendicular distance between the bearings 18 and 19 and bearings 20 and 21 respectively, and causing the members 20 and 21 to slide in the openings 29 and 30 toward members 18 and 19. If, however, the vertical displacement occurs when the coupling is in a position 90 degrees from that explained and is in the position indicated in Figs. 1 and 2, then the members 17, the arms 23 and the link 22 turn together as a fixed structure about the balls at the extremities of the members 17 and the movable bearing members 20 and 21 approach the fixed bearing members 18 and 19 respectively. If the displacement occurs when the coupling is intermediate of the two positions just explained then the balls move slightly in their sockets and the movable bearing members approach the fixed bearing members, the members 17 turn in bearings 24 and 25 and bearings 24 and 25 together with arms 23 and link 22 turn slightly about the balls.

Thus this construction permits relative vertical displacement or angularity of the axle and wheels with respect to the quill shaft and source of motive power and transfers the required torque under all conditions without producing any forces tending to change their relative position.

In the modification of my invention shown in Fig. 6, torque is transmitted from the quill shaft 37 to the axle 38 by a linkage comprising axially extending members 36 connected by ball and socket joints 44 to the quill structure and axle and joined intermediate of their ends by a connection or link 39. The link 39 is provided with yokes 32, the arms 33 thereof having openings 34 formed therein, and the member 36 is securely fastened intermediate its ends to a transverse pivot pin 35 which is arranged in the opening 34 transversely of the axis of the link 39 and the shaft and axle.

Relative vertical movement of angularity of the shaft and axle causes a movement of the parts of the coupling similar to that explained for the disclosure shown in Figs. 1 to 5, the element 35 pivoting in opening 34 so as to change the angularity between the axes of the member 36 and link 39 performs the function of the bearing members 24 and 25 and the arms 23.

In a further modification of my invention, shown in Figs. 7 and 8, torque is transmitted from the shaft 40 to the shaft 41 by a linkage comprising axially extending members 42 connected by ball and socket joints 43 to rotatable elements and joined intermediate their ends by a connection or link 45. The members 42 are formed with slots 47 intermediate their ends and the link 45 is provided with integral transverse arms 50 pivotally arranged in slots 47 by means of pins 46 passed through the arms and the sides of the members 42, the axes of the pins being transverse to the link 45 and member 42. The pin 46 is held loosely by cap 48 and cotter pin 49. The remainder of the structure is similar to that described in Figs. 1 to 5.

The mode of operation of the foregoing described construction will be readily apparent from the detailed description of Figs. 1 to 5, as the former operates in substantially the same way as the latter. Upon tilting of one rotatable element with respect to another the members 42 pivot on pins 46 changing the angularity between the link 45 and the members 42. This movement performs the function of the bearing members 24 and 25 and the arms 23 in the disclosure of Figures 1 to 5, the movement of the other parts of the structure is substantially the same.

I have illustrated my improved coupling in connection with parts of a locomotive or car, but it is apparent that it may be used in any other construction where a flexible coupling is desirable. Moreover, modifications of the various forms of my invention, which I have illustrated and described will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is,—

1. A flexible coupling comprising two rotatable elements, means including members extending axially of said elements and a link pivotally connecting said members together intermediate the ends thereof for transmitting torque between said elements.

2. A flexible coupling comprising two rotatable elements, means including members extending substantially axially of said elements having a universal connection therewith and pivotally connected together intermediate the ends thereof for transmitting torque between said elements.

3. A flexible coupling including a rotatable element, fixed bearings carried by said element, a plurality of members universally pivoted in said bearings and extending substantially axially of said element, said members having bearings intermediate their ends, transverse connecting means arranged in said intermediate bearings, and slidable bearings in another rotatable element and universally pivoted to the other end of said members.

4. A flexible coupling including a rotatable element, fixed bearings carried by said element, a plurality of members universally pivoted thereto and extending substantially axially of said element, said members having bearings intermediate their ends, connecting means engaging said intermediate bearings, slidable bearings in another rotatable element universally pivoted to the other end of said members, one of said slidable bearings being rectangular in section and slidably fitting in a rectangular opening formed in said last mentioned rotatable element.

In witness whereof, I have hereunto set my hand this 7th day of August, 1930.

ROBERT G. ANDERSON.